T. F. POIRET.
FIRST COMBING MACHINE OF CARDING ENGINES.
APPLICATION FILED JUNE 27, 1910.

1,050,751.

Patented Jan. 14, 1913.

WITNESSES

INVENTOR
Theodore Frederic Poiret
BY
ATTORNEYS

UNITED STATES PATENT OFFICE.

THEODORE FREDERIC POIRET, OF PARIS, FRANCE.

FIRST-COMBING MACHINE OF CARDING-ENGINES.

1,050,751.  Specification of Letters Patent.  Patented Jan. 14, 1913.

Application filed June 27, 1910. Serial No. 569,165.

*To all whom it may concern:*

Be it known that I, THEODORE FREDERIC POIRET, a citizen of the Republic of France, and a resident of 40 Rue St. Denis, Paris, France, have invented new and useful Improvements in First-Combing Machines of Carding-Engines, of which the following is a specification.

This invention relates to improvements in automatic unraveling conveyers for a wool carding engine, in which the wool to be carded, being placed in a trough, is seized by a toothed drum rotating in said trough, and afterward evened upon the drum by a saw-toothed comb having an oscillating motion tangent to the drum and acting alternately.

The object of the improvements of this invention are characterized: First. The trough wherein the wool to be worked is placed has imparted to it an oscillating motion for the purpose of avoiding the blockage of the wool between the base of the trough and the toothed drum. Second. The employment of a triple comb having alternative and slow oscillating movement, of regulated amplitude in the direction of the length of the wool, and provided with three parallel and stepped rows of teeth, the teeth of each row being of different degrees of fineness, the first row of teeth being curved; whereby the wool is unraveled stretched and distributed upon the drum in an even layer. Third. The releasing of the wool layer from the teeth of the drum is done by a brush without tearing the wool fiber.

Said improvements are shown in the annexed drawing, in which—

Figure 1:
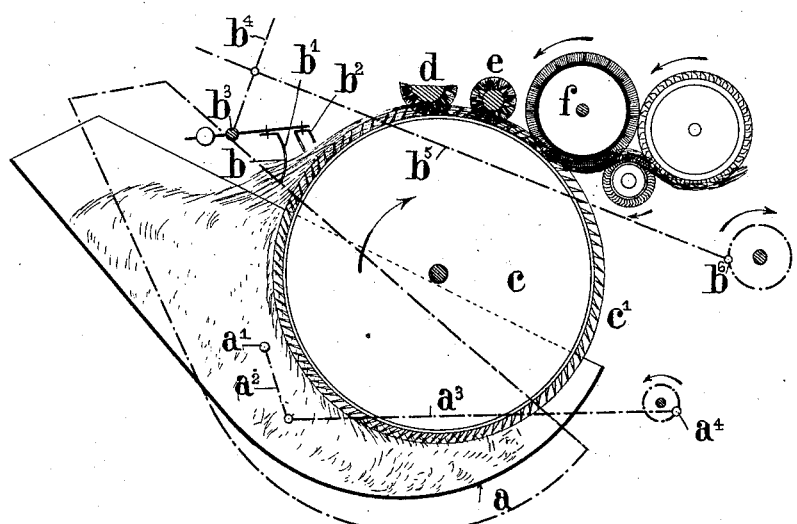
Figure 2:
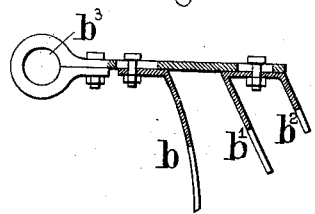
Figure 3:
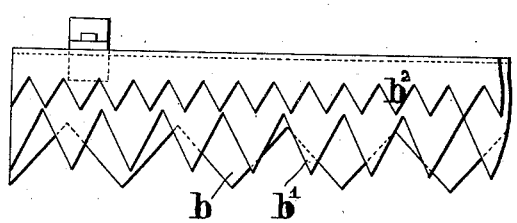

Figure 1 represents diagrammatically a longitudinal section, of a portion of a carding engine showing the improvement applied thereto. Figs. 2 and 3 indicate, in a transverse section and in front view, the regulating, unraveling and stretching triple comb.

$a$ is a sheet iron trough mounted on a rock shaft $a'$ to which is secured a lever $a^2$ connected by a rod $a^3$ to a crank disk $a^4$, so that a slow oscillating motion is imparted to the trough.

The triple comb is composed of three stepped rows of teeth of different fineness. The lower row of teeth $b$ are curved and the teeth of the two upper rows $b'$, $b^2$ are straight, the teeth of $b'$ being finer than the teeth $b$ and the teeth of $b^2$ being finer than the teeth of $b'$. The comb is formed from sheets of suitable material cut like saw teeth and adjustably secured to an oscillating arm mounted on the shaft $b^3$ provided with the arm $b^4$, which by means of a connecting rod $b^5$ is connected with a crank disk $b^6$. The amplitude of the oscillation can be regulated at will. The conveying drum $c$ is provided with steel teeth $c'$ and is journaled above the trough $a$ in which it rotates very slowly. A fixed semi-circular brush $d$ is disposed above the drum $c$. A freely revoluble brush $e$ is disposed behind the fixed brush $d$ and above the drum $c$, and in rear of the brush $e$ is the discharger $f$. The washed wool on its exit from the drier, is placed in the trough $a$ where it is seized by the teeth $c'$ of the drum $c$ in its slow rotation.

The triple comb works alternately and successively by its three rows of teeth, and progressively unravels the wool, stretches it and evens it upon the drum, so that the wool presents the form of a layer or a fleece thoroughly unraveled, whereby the cleaning of the same is greatly facilitated. The thickness of the layer is regulated by adjusting the comb on its supporting arm so that it will be closer to or farther from the surface of the loading drum. The degree of moisture of the wool does not in any way modify the layer thus determined. The oscillating motion of the box $a$ avoids the clogging and the rolling of the wool between the drum $c$ and the bottom of the trough $a$. The wool layer unraveled, stretched and evened by the triple comb immediately meets the semi-circular stationary brush $d$, and as the drum $c$ continues to revolve, there is a further stretching and unraveling of the wool. The circular brush $e$, the rotation of which is free and is dragged by the drum $c$, serves to retain the wool in the teeth $c'$ of the drum at the time when the discharger $f$ takes it therefrom to deliver it without stretching it to the advance train of the carding engine.

I claim—

1. In an automatic unraveling and stretching conveyer for a wool carding machine, the combination with a rotary toothed drum, of an oscillating comb mounted adjacent to the drum and having three stepped rows of teeth of different sizes and lengths, the teeth of the front row being the smallest and shortest and the teeth of the rear row being the largest and longest.

2. In a carding engine, the combination with a rotary toothed drum, of an oscillating comb mounted adjacent to the drum and having stepped rows of adjustable teeth, the teeth of one row being of a different size from the teeth of the adjacent row, the teeth of the front row being the smallest, and the teeth of the rear row the largest.

3. A comb for carding engines having a plurality of rows of teeth, the teeth of one row being of a different length and size from the teeth of the adjacent row, the teeth of the front row being the smallest and shortest, and the teeth of the rear row the largest and longest.

In testimony whereof I have signed my name to this specification, in the presence of two subscribing witnesses.

THEODORE FREDERIC POIRET.

Witnesses:
ANTOINE DÉSÉRAN,
LEON PEILLET.

Copies of this patent may be obtained for five cents each, by addressing the "Commissioner of Patents, Washington, D. C."